(12) United States Patent
Yukimasa (10) Patent No.: US 11,824,369 B2
(45) Date of Patent: Nov. 21, 2023

(54) WIRELESS POWER TRANSMISSION SYSTEM, CONTROL METHOD OF CONTROLLING WIRELESS POWER TRANSMISSION SYSTEM, AND STORAGE MEDIUM

(71) Applicant: CANON KABUSHIKI KAISHA, Tokyo (JP)

(72) Inventor: Koji Yukimasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/508,816

(22) Filed: Oct. 22, 2021

(65) Prior Publication Data

US 2022/0131418 A1    Apr. 28, 2022

(30) Foreign Application Priority Data

Oct. 27, 2020   (JP) .................................. 2020-179746

(51) Int. Cl.
*H02J 50/20*         (2016.01)
(52) U.S. Cl.
CPC ..................................... *H02J 50/20* (2016.02)
(58) Field of Classification Search
CPC .. H02J 50/20; H02J 50/12; H02J 50/70; H02J 50/10; H02J 50/40; H02J 50/23; B60L 2210/40; Y02T 10/70; Y02T 10/7072; H02M 1/14; H02M 3/1582
See application file for complete search history.

(56) References Cited

U.S. PATENT DOCUMENTS

| 2013/0127605 A1* | 5/2013 | Beasley | G08C 17/02 340/13.25 |
| 2017/0098963 A1* | 4/2017 | Takahashi | H02M 7/537 |
| 2019/0326785 A1* | 10/2019 | Freitas | H01P 1/2007 |

FOREIGN PATENT DOCUMENTS

JP        H07154312 A      6/1995

* cited by examiner

*Primary Examiner* — Lincoln D Donovan
*Assistant Examiner* — Tyler J Pereny
(74) *Attorney, Agent, or Firm* — Canon U.S.A., Inc. IP Division (57) ABSTRACT

A wireless power transmission system includes a transmission line, one end of which is connected to a power reception unit configured to receive AC power, a splitting unit, one end of which is connected to an other end of the transmission line and an other end of which is split into a plurality of transmission lines, a first rectification unit connected to a second transmission line of the splitting unit, and a second rectification unit connected to a third transmission line. A transmission line length of the second transmission line and a transmission line length of the third transmission line are each substantially equal to one fourth of a wavelength of the AC power.

13 Claims, 11 Drawing Sheets

|  | S11 | S21 | S22 | S32 |
|---|---|---|---|---|
| FIRST EMBODIMENT | -23.0 | -3.3 | -6.5 | -5.9 |
| CONVENTIONAL TECHNIQUE | -10.2 | -3.6 | -9.1 | -3.8 |

|  | S11 | S21 | S22 | S32 |
|---|---|---|---|---|
| SECOND EMBODIMENT | -22.7 | -3.3 | -6.7 | -5.8 |
| CONVENTIONAL TECHNIQUE | -10.2 | -3.6 | -9.1 | -3.8 |

|  | S11 | S21 | S22 | S32 |
|---|---|---|---|---|
| THIRD EMBODIMENT | -23.6 | -3.3 | -25.3 | -30.5 |
| CONVENTIONAL TECHNIQUE | -10.2 | -3.6 | -9.1 | -3.8 |

|  | S11 | S21 | S22 | S32 |
|---|---|---|---|---|
| FOURTH EMBODIMENT | -21.0 | -3.3 | -26.0 | -27.7 |
| CONVENTIONAL TECHNIQUE | -10.2 | -3.6 | -9.1 | -3.8 |

WIRELESS POWER TRANSMISSION SYSTEM, CONTROL METHOD OF CONTROLLING WIRELESS POWER TRANSMISSION SYSTEM, AND STORAGE MEDIUM

BACKGROUND

Field

The present disclosure relates to a wireless power transmission system, a control method of controlling a wireless power transmission system, and storage medium.

Description of the Related Art

In recent years, a system for wirelessly transmitting power using an electromagnetic wave in a microwave wavelength range from several meters to several tens of meters has been under research and development. In such a system, an electromagnetic wave transmitted from an antenna of a power transmitter is received by an antenna of a power receiver, and the received high-frequency AC power is rectified to DC power, which is used to charge a charging unit of the power receiver or is used to directly drive a system.

In addition to a system in which one power system is obtained from one antenna, a system is also known in which a high frequency signal received from one antenna is split and rectified. Japanese Patent Laid-Open No. 7-154312 discloses a system in which a received signal is split into a plurality of signals, each of which may be used as power and a communication signal.

However, in the splitting and rectifying system in which a received signal is split, if the received signal is simply split, a signal reflection can occur between a splitting point and a rectifier, which causes an attenuation of the signal. As a result, a reduction can occur in a conversion efficiency from the high frequency signal to the DC signal.

SUMMARY

In view of the above, various embodiments of the present disclosure provide techniques for suppressing a reduction in a conversion efficiency in a wireless power transmission system in which received power is split.

According to one embodiment of the present disclosure, a wireless power transmission system is provided that includes a power reception unit configured to receive AC power, a first transmission line, one end of which is connected to the power reception unit, a splitting unit configured such that one end of the splitting unit is connected to an other end of the first transmission line and the splitting unit is split into at least one end of a second transmission line and one end of a third transmission line, a first rectification unit connected to an other end of the second transmission line, and a second rectification unit connected to an other end of the third transmission line, wherein a transmission line length of the second transmission line and a transmission line length of the third transmission line are each substantially equal to one fourth of a wavelength of the AC power.

Further features of the present disclosure will become apparent from the following description of example embodiments with reference to the attached drawings.

DESCRIPTION OF THE EMBODIMENTS

Example embodiments of the present disclosure are described in detail below with reference to the accompanying drawings. Note that configurations shown in the following embodiments are merely examples, and the present invention is not limited to these illustrated configurations.

First Embodiment

Figure 1:
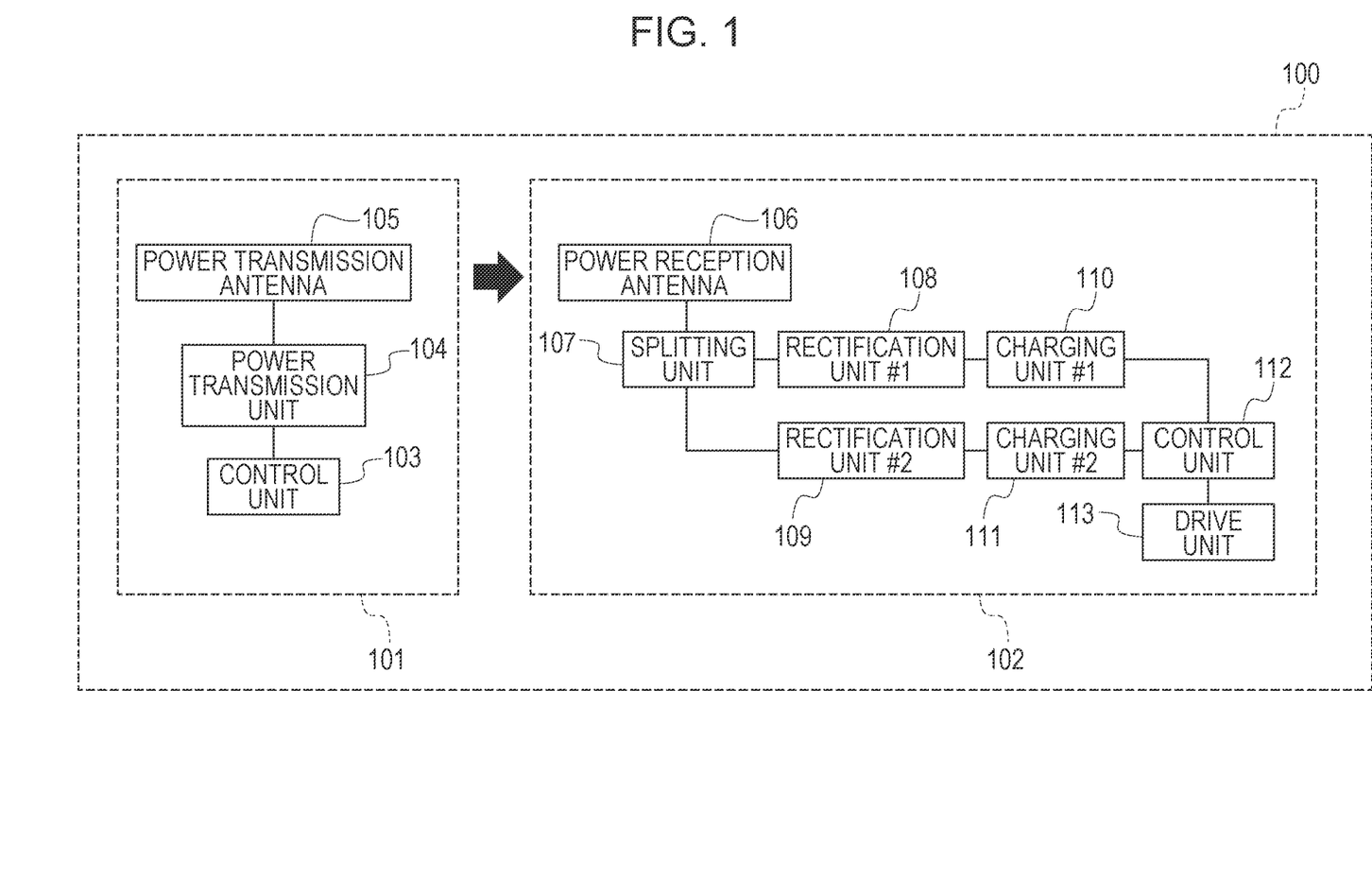
FIG. 1 is a diagram showing a system configuration of a wireless power transmission system according to a first embodiment.

FIG. 1 is a diagram showing a system configuration of a wireless power transmission system 100 (hereinafter also referred to simply as the system 100) according to a first embodiment. The system 100 includes a power transmitter 101 that transmits AC power and a power receiver 102 that receives the AC power. The power receiver 102 rectifies the received AC power to DC power and uses it as system drive power.

The power transmitter 101 includes a control unit 103, a power transmission unit 104, and a power transmission antenna 105. In the power transmitter 101, under the control of the control unit 103, the power transmission unit 104 generates a microwave electromagnetic wave and radiates the generated microwave electromagnetic wave into space via the power transmission antenna 105.

The power receiver 102 includes a power reception antenna 106, a splitting unit 107, a first rectification unit 108, a second rectification unit 109, a first charging unit 110, a second charging unit 111, a control unit 112, and a drive unit 113. The electromagnetic wave radiated from the power transmitter 101 is received via the power reception antenna 106 and is split by the splitting unit 107. The split signals are rectified to DC power respectively by the first rectification unit 108 and the second rectification unit 109. Each of the rectified DC power is used to charge the first charging unit 110 or the second charging unit 111. The control unit 112 causes the drive unit 113 to perform driving using the power charged in each charging unit.

Figure 2A:
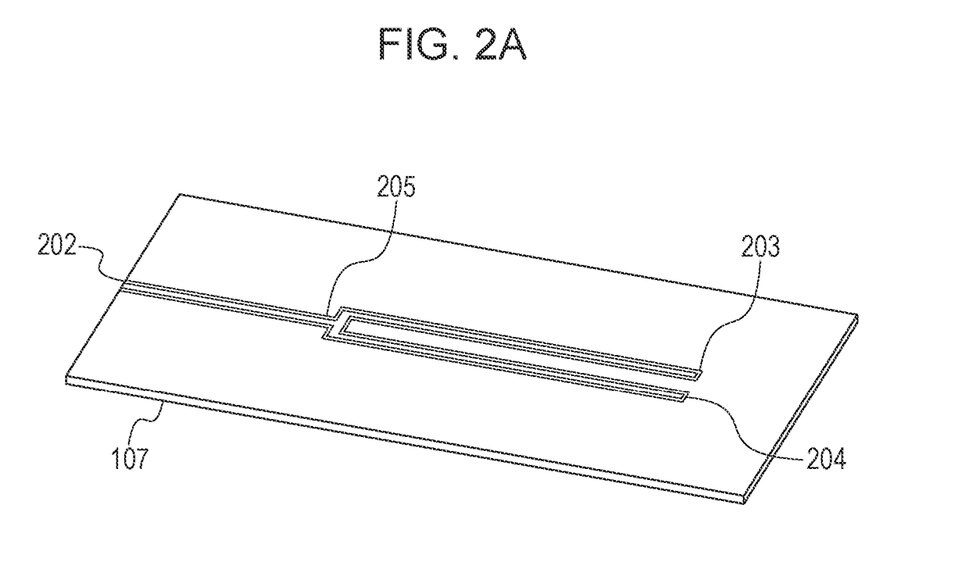
FIG. 2A is a diagram showing a configuration of a splitting unit according to the first embodiment.

FIG. 2A illustrates a configuration of the splitting unit 107 according to the first embodiment. An input part 202 is connected to the power reception antenna 106 of the wireless power system 100 shown in FIG. 1. A transmission line extending on a substrate starting from the input part 202 is split at the splitting part 205 into two transmission lines, which end at a first output part 203 and a second output part 204, respectively. The first rectification unit 108 of the wireless power system 100 is connected to the first output part 203, and the second rectification unit 109 is connected to the second output part 204. The received power received by the power reception antenna 106 is input via the input part 202, split at the splitting part 205, and output from the first output part 203 or the second output part 204.

The distance from the splitting part 205 to each output part is equal to about a quarter of an effective wavelength. The effective wavelength refers to the effective wavelength of the transmission power frequency in the splitting unit 107, which is determined by the frequency of the input power, the dielectric constant of the substrate on which the splitting unit 107 is formed, and the type of the transmission line. For example, in a case where an electromagnetic wave of 1 GHz is used in a system and the splitting unit 107 is given by a coplanar waveguide with ground formed on a substrate of FR4 (Flame Retardant Type 4) with a thickness of 1 mm and a dielectric constant of 4.4 so as to have a characteristic impedance of 50Ω, the effective dielectric constant of the splitting unit 107 on the substrate is 2.93, and the quarter wavelength of the effective wavelength is 43.8 mm.

In the first embodiment, since the length from the splitting part 205 to the first output part 203 and the length from the splitting part 205 to the second output part 204 are each equal to the quarter of the effective wavelength, the characteristic impedance after being splint is approximately equal to the characteristic impedance before being split.

Figure 2B:
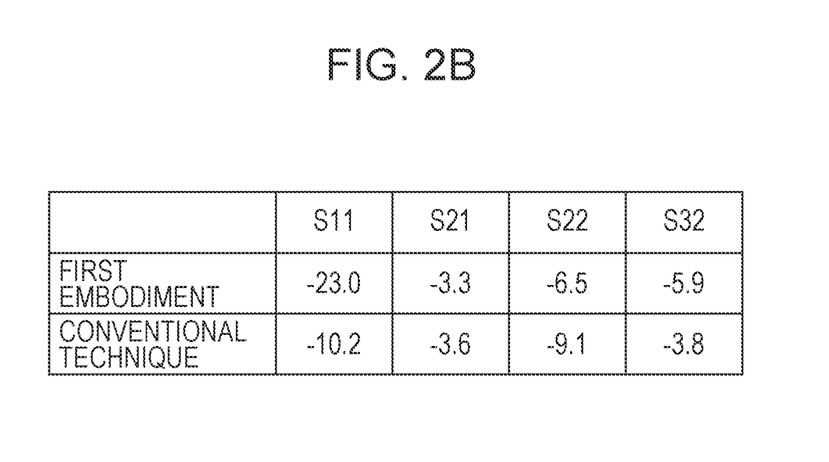
FIG. 2B is a diagram showing scattering parameters thereof.

FIG. 2B shows scattering parameters obtained for a case where ports are defined such that the input part 202 is port #1, the first output part is port #2, and the second output part 204 is port #3. In a table in FIG. 2B, a row of "FIRST EMBODIMENT" indicates scattering parameters at a frequency of 1 GHz for the splitting unit 107 according to the first embodiment shown in FIG. 2A. and a row of "CONVENTIONAL TECHNIQUE" indicates scattering parameters for a case where output parts of the splitting unit are provided at locations directly following the splitting part.

The impedance of port #1 is set to 50Ω, and the impedance of each of ports #2 and #3 is set to 25Ω to achieve impedance matching at the splitting part. In the case of the splitting unit 107 according to the first embodiment, the reflection S11 at the input part is smaller, the loss S21 to the output part is smaller, and the separation S32 between the output parts is better than those according to the conventional technique.

Figure 3A:
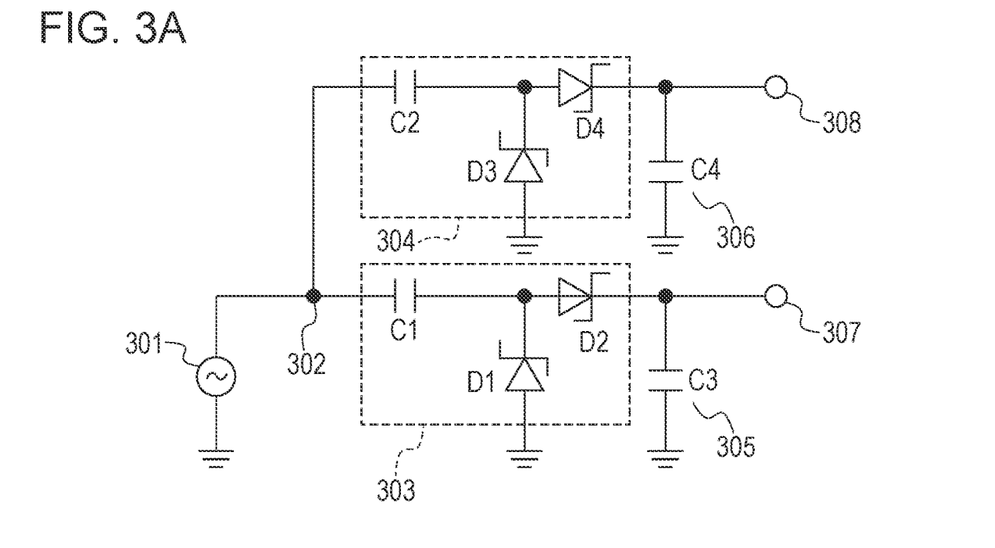
FIG. 3A is a circuit diagram of a power receiver according to the first embodiment.

FIG. 3A illustrates a circuit diagram of the power receiver 102 according to the first embodiment. An AC voltage source 301 is a voltage source simulating the received power, and a splitting part 302 indicates the splitting unit 107 shown in FIG. 2A. Rectification circuits 303 and 304 respectively correspond to the first rectification unit 108 and the second rectification unit 109 shown in FIG. 1.

In the circuit shown in FIG. 3A, Schottky barrier diodes are used in the rectification circuits 303 and 304. In the rectification circuit 303, at least one diode D2 is connected such that an anode thereof is connected to the first output part 203 of the splitting unit 107, and a cathode is connected to an output part 307. In the rectification circuit 304, at least one diode D4 is connected such that an anode thereof is connected to the second output part 204 of the splitting unit 107, and a cathode is connected to an output part 308.

A diode D1 is connected such that an anode thereof is grounded, and a cathode thereof is connected to a part connecting the diode D2 and a capacitor C1. A diode D3 is connected such that an anode thereof is grounded, and a cathode thereof is connected to a part connecting the diode D4 and a capacitor C2.

A capacitor C3 (305) and a capacitor C4 (306) respectively function as the first charging unit 110 and the second charging unit 111. The output parts 307 and 308 are connected to the control unit 112 and the drive unit 113.

Figure 3B:
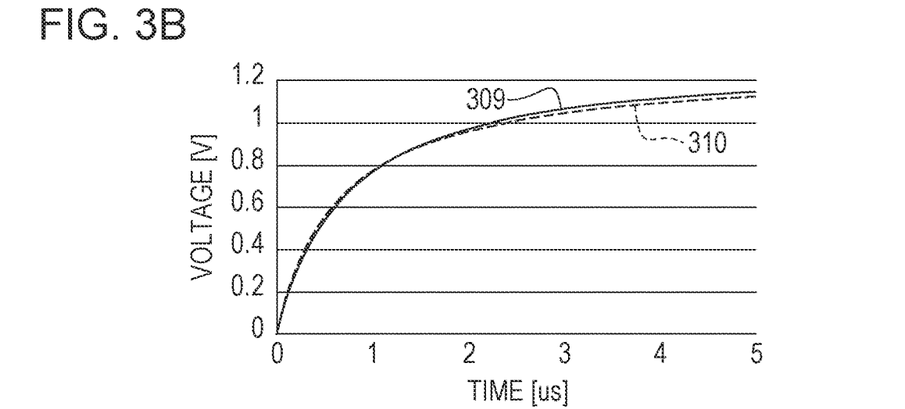
FIGS. 3B and 3C are each a graph showing a simulated waveform of a voltage at an output part.
Figure 3C:
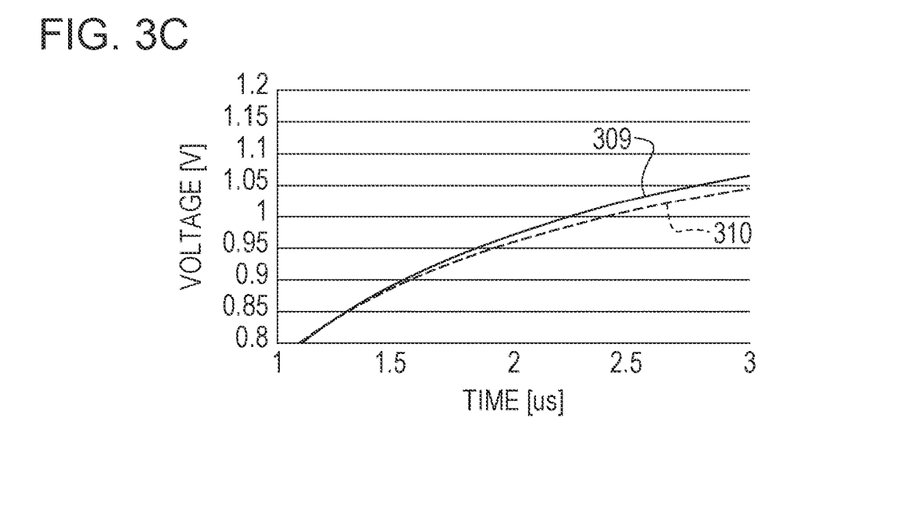

FIGS. 3B and 3C each show a result of a simulation of a voltage-time waveform at the output part 307 for a case where the AC voltage source 301 outputs a power of 1 mW at a frequency of 1 GHz, and the capacitors C1 and C3 each have a capacitance of 1000 pF. In each of FIGS. 3B and 3C, a solid line 309 represents a voltage waveform at the output part 307 for a case where the splitting unit 107 according to the first embodiment shown in FIG. 2A is used as the splitting part 302, a broken line 310 represents a voltage waveform at the output part 307 for a case where the splitting unit according to the conventional technique described above with reference to FIG. 2B is used as the splitting part 302. Since shapes and circuits of parts following splitting part are symmetrical between split parts, a result for the output part 308 is omitted.

FIG. 3C is an enlarged representation of a part of the graph in an output voltage range from 0.8 to 1.2 V and a time range from 1 to 3 us in FIG. 3B. From FIG. 3C, it can be seen that a time needed for the output voltage to reach 1V is 2.24 us for the configuration according to the first embodiment, and 2.38 us for the configuration according to the conventional technique. That is, the first embodiment can charge the voltage to 1 V 5.9% faster than the conventional technique. The waveforms in FIGS. 2B and 2C change depending on the voltage source, the diodes, the capacitance values of C1 and C3, and types. However, the features of the present embodiment are maintained regardless of the parameter values and types of parts, and similar effects can be obtained.

In the present embodiment, diodes are used to rectify the AC power, but other electronic components such as transistors may be used. The power transmission/reception antennas may be directional antennas. The antenna may include a plurality of elements and may perform beam tilting together with the power transmission unit and the control unit. In a case where sufficiently high power can be received, the first and second charging units may not be provided, and the first and second rectification units may be directly connected to the control unit and may be used to drive the system.

In the present embodiment, the number of splits is two, but the number of splits is not limited to two, and the splitting unit may have three or more splits. Also in this case, the splitting unit may be configured in a similar manner as described above according to the present embodiment while preventing a reduction in the conversion efficiency to a DC signal.

Second Embodiment

In the wireless power transmission system 100 according to the first embodiment described above, the splitting unit 107 is configured such that the length from the splitting part to each output part is equal to one-quarter the effective wavelength. In a second embodiment described below, a splitting unit 107 is configured such that the length from the splitting part to each output part is equal to one-quarter the effective wavelength the present embodiment, and furthermore, each transmission line following the splitting part has a characteristic impedance equal to about √2 times a characteristic impedance of a transmission line before being split. The following description of the second embodiment is focused on differences from the first embodiment.

The system configuration of the wireless power transmission system 100 according to the second embodiment is similar to that according to the first embodiment described above with reference to FIG. 1.

Figure 4A:
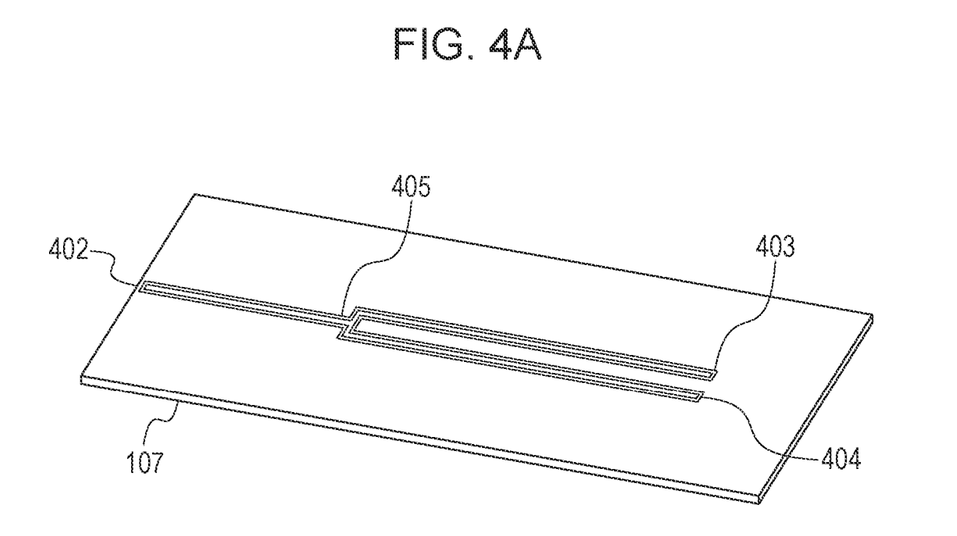
FIG. 4A is a diagram showing a configuration of a splitting unit according to a second embodiment.

FIG. 4A shows a configuration of a splitting unit 107 according to the second embodiment. An input part 402, a first output part 403, a second output part 404, and a splitting part 405 are respectively similar to the input part 202, the first output part 203, the second output part 204, and the splitting part 205 described above with reference to FIG. 2A, and thus a description thereof is omitted. In the second embodiment, as with the splitting unit 107 according to the first embodiment, the length from the splitting part 405 to each output part is equal to one-quarter the effective wavelength. Furthermore, in the splitting unit 107 according to the second embodiment, the characteristic impedance of each transmission line following the splitting part 405 is approximately equal to √2 times the characteristic impedance of the transmission line before being split, and the impedance at the output part of each split transmission line is equal to the input impedance.

Figure 4B:
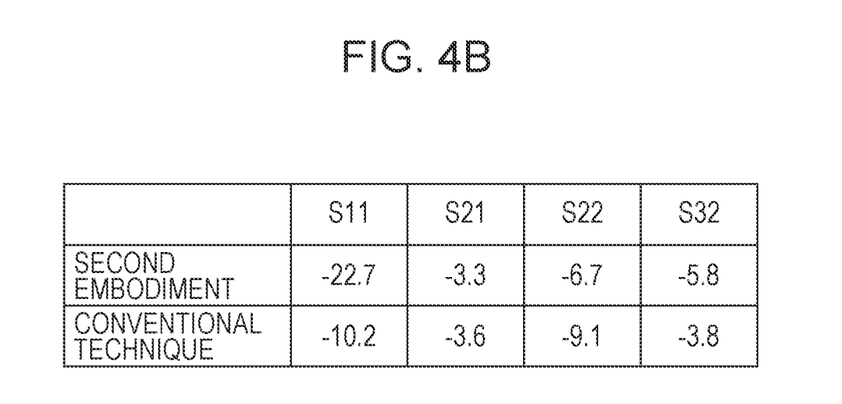
FIG. 4B is a diagram showing scattering parameters thereof.

FIG. 4B shows, in a similar manner as in FIG. 2B, scattering parameters at a frequency of 1 GHz for the splitting unit 107 configured as shown in FIG. 4A according to the second embodiment and for the splitting unit configured according to the conventional technique.

The impedance at each of the port #1, the port #2, and the port #3 is set to 50Ω. In the case of the splitting unit 107 according to the second embodiment, the reflection S11 at the input part is smaller, the loss S21 to the output part is smaller, and the separation S32 between the output parts is better than those according to the conventional technique.

Figure 5A:
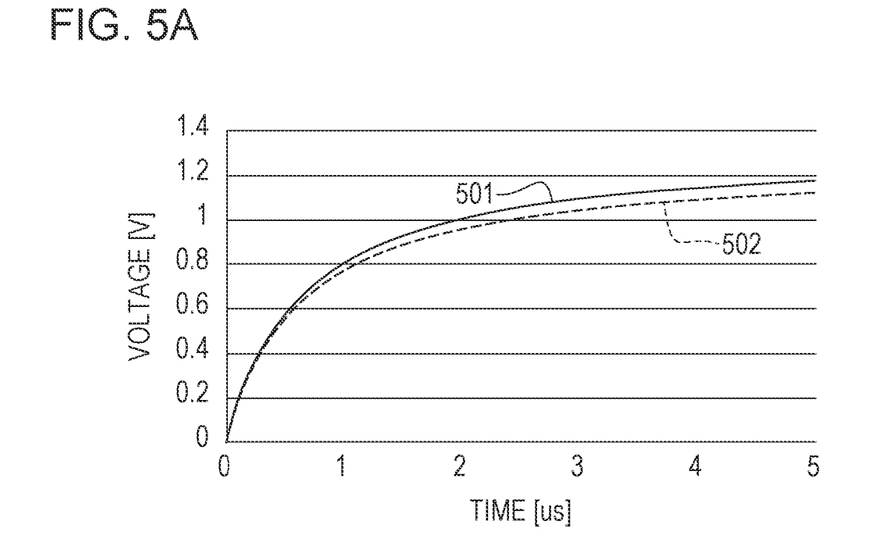
FIGS. 5A and 5B are each a graph showing a simulated waveform of a voltage of an output part according to the second embodiment.
Figure 5B:
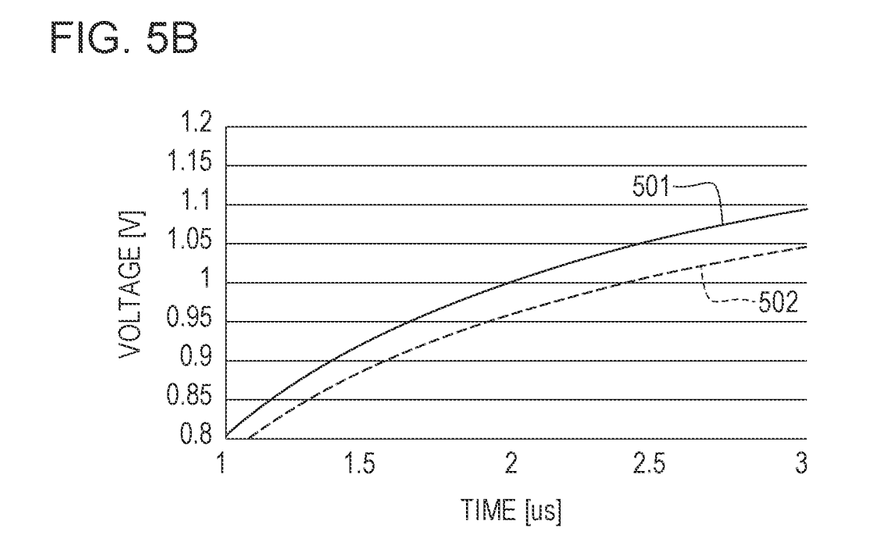

The circuit configuration of the power receiver 102 using the splitting unit 107 according to the second embodiment is the same as that described above with reference to the circuit diagram shown in FIG. 3A according to the first embodiment. FIG. 5A shows a result of a simulation of a voltage-time waveform at the output part 307 for the same parameter values as those in FIG. 3B according to the first embodiment. FIG. 5B is an enlarged representation of a part of the graph in a range of the output voltage from 0.8 to 1.2 V and a range of time from 1 to 3 us of FIG. 5A. In each of FIGS. 5A and 5B, a solid line 501 represents a voltage waveform at the output part 307 for a case where the splitting unit 107 according to the first embodiment shown in FIG. 4A is used as the splitting part 302, a broken line 502 represents a voltage waveform at the output part 307 for a case where the splitting unit according to the conventional technique is used as the splitting part 302. From these figures, it can be seen that a time needed for the output voltage to reach 1 V is 1.98 us for the configuration according to the second embodiment, and 2.38 us for the configuration according to the conventional technique. That is, the second embodiment can charge the voltage to 1 V 16.8% faster than the conventional technique can.

In the present embodiment, diodes are used to rectify the AC power, but other electronic components such as transistors may be used. The power transmission/reception antennas may be directional antennas. The antenna may include a plurality of elements and may perform beam tilting together with the power transmission unit and the control unit. In a case where sufficiently high power can be received, the first and second charging units may not be provided, and the first and second rectification units may be directly connected to the control unit and may be used to drive the system.

In the present embodiment, the number of splits is two, but the number of splits is not limited to two, and the splitting unit may have three or more splits. Also in this case, the splitting unit may be configured in a similar manner as described above according to the present embodiment while preventing a reduction in the conversion efficiency to a DC signal.

Third Embodiment

In the third embodiment, unlike the first and second embodiments, the splitting unit 107 is configured such that a resistor is connected between the two output parts of the splitting unit 107. The following description of the third embodiment is focused on differences from the first and second embodiment.

The system configuration of the wireless power transmission system 100 according to the third embodiment is similar to that according to the first embodiment described above with reference to FIG. 1.

Figure 6A:
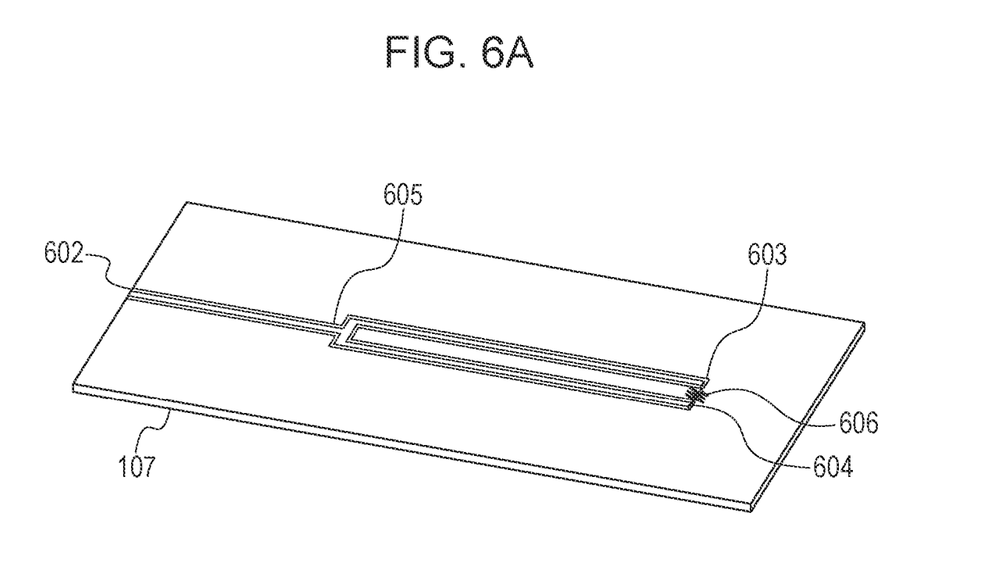
FIG. 6A is a diagram showing a configuration of a splitting unit according to a third embodiment.

FIG. 6A illustrates a configuration of a splitting unit 107 according to the third embodiment. An input part 602, a first output part 603, a second output part 604, and a splitting part 605 are respectively similar to the input part 202, the first output part 203, the second output part 204, and the splitting part 205 described above with reference to FIG. 2A, and thus a description thereof is omitted. In this third embodiment, as with the splitting unit 107 according to the first embodiment, the length from the splitting part 605 to each output part is equal to one-quarter the effective wavelength. In the splitting unit 107 according to the third embodiment, a resistor 606 is connected between the first output part 603 and the second output part 604. The resistor 606 is for increasing the degree of separation between two outputs. The resistor 606 may have a resistance approximately twice the output impedance. However, the impedance of the resistor 606 may be arbitrarily selected. In the present embodiment, the impedance of the resistor 606 is set to 100Ω.

Figure 6B:
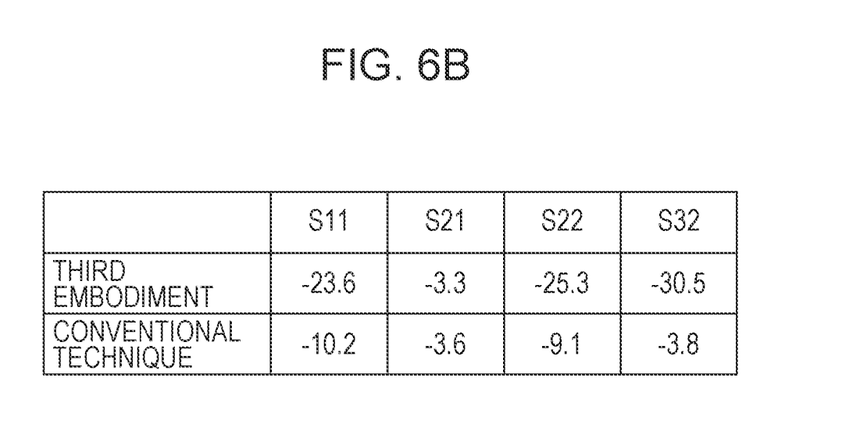
FIG. 6B is a diagram showing scattering parameters thereof.

FIG. 6B shows, in a similar manner as in FIG. 2B, scattering parameters at a frequency of 1 GHz for the splitting unit 107 configured as shown in FIG. 6A according to the third embodiment and for the splitting unit configured according to the conventional technique.

However, ports #2 and #3 are set to 25Ω in order to achieve impedance matching at the splitting part.

In the case of the splitting unit 107 according to the present embodiment, the reflection S11 at the input part is smaller, the loss S21 to the output part is smaller, and the separation S32 between the output parts is better than those according to the conventional technique.

Figure 7A:
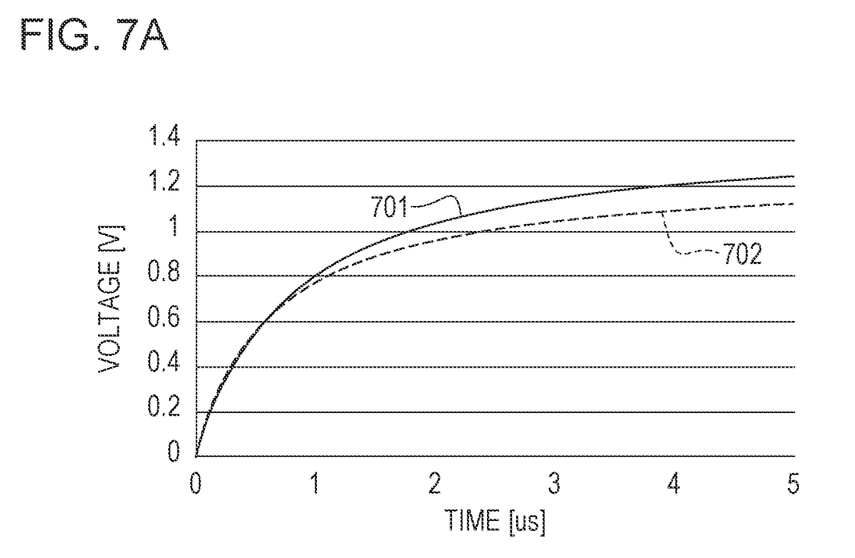
FIGS. 7A and 7B are each a graph showing a simulated waveform of a voltage at an output part according to the third embodiment.
Figure 7B:
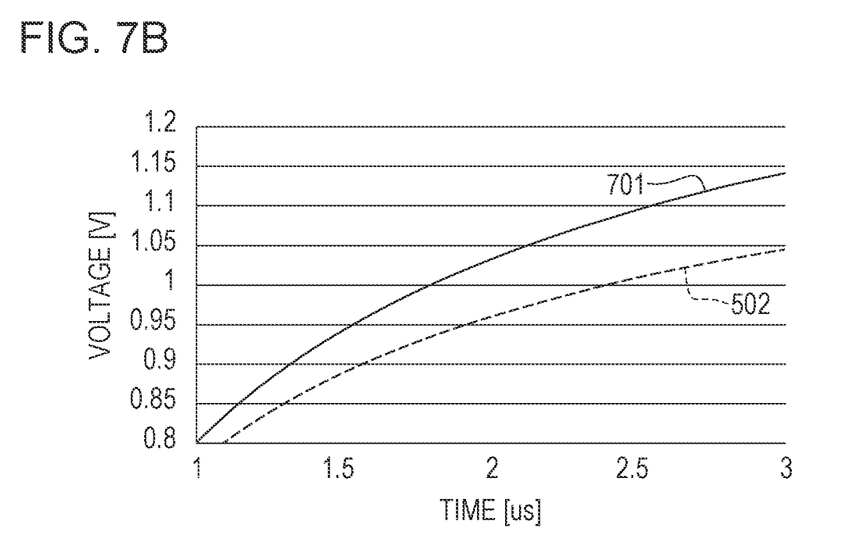

The circuit configuration of the power receiver 102 using the splitting unit 107 according to the third embodiment is the same as that described above with reference to the circuit diagram shown in FIG. 3A according to the first embodiment. FIG. 7A shows a result of a simulation of a voltage-time waveform at the output part 307 for the same parameter values as those in FIG. 3B according to the first embodiment. FIG. 7B is an enlarged representation of a part of the graph in FIG. 7A in a range of the output voltage from 0.8 to 1.2 V and a range of time from 1 to 3 us. In each of FIGS. 7A and 7B, a solid line 701 represents a voltage waveform at the output part 307 for a case where the splitting unit 107 according to the third embodiment shown in FIG. 6A is used as the splitting part 302, a broken line 702 represents a voltage waveform at the output part 307 for a case where the splitting unit according to the conventional technique is used as the splitting part 302. From these figures, it can be seen that a time needed for the output voltage to reach 1 V is 1.79 us for the configuration according to the third embodiment, and 2.38 us for the configuration according to the conventional technique. That is, the third embodiment can charge the voltage to 1 V 24.8% faster than the conventional technique can.

In the present embodiment, diodes are used to rectify the AC power, but other electronic components such as transistors may be used. The power transmission/reception antennas may be directional antennas. The antenna may include a plurality of elements and may perform beam tilting together with the power transmission unit and the control unit. In a case where sufficiently high power can be received, the first and second charging units may not be provided, and the first and second rectification units may be directly connected to the control unit and may be used to drive the system.

In the present embodiment, the number of splits is two, but the number of splits is not limited to two, and the splitting unit may have three or more splits. Also in this case, the splitting unit may be configured in a similar manner as described above according to the present embodiment while preventing a reduction in the conversion efficiency to a DC signal.

Fourth Embodiment

In a fourth embodiment, a splitting unit 107 is configured so as to have all the features according to the first to third embodiments described above. That is, the distance from the splitting part to each output part is equal to about a quarter of an effective wavelength, the characteristic impedance of each transmission line following the splitting part is approximately √2 times the characteristic impedance of the transmission line before being split, and a resistor is connected between the two output parts. The following description of the fourth embodiment is focused on differences from the first to third embodiments.

The system configuration of the wireless power transmission system 100 according to the fourth embodiment is similar to that according to the first embodiment described above with reference to FIG. 1.

Figure 8A:
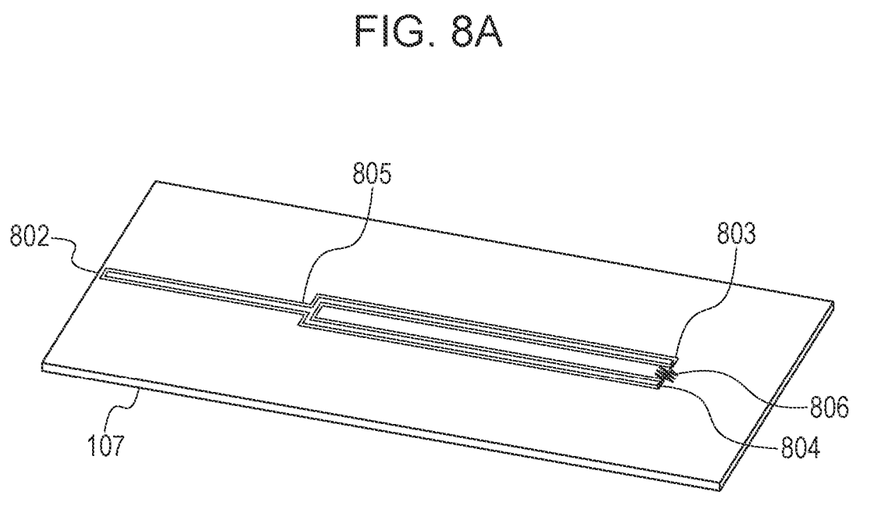
FIG. 8A is a diagram showing a configuration of a splitting unit according to a fourth embodiment.

FIG. 8A illustrates a configuration of a splitting unit 107 according to the fourth embodiment. An input part 802, a first output part 803, a second output part 804, and a splitting part 805 are respectively similar to the input part 202, the first output part 203, the second output part 204, and the splitting part 205 described above with reference to FIG. 2A, and thus a description thereof is omitted. In this third embodiment, as with the splitting unit 107 according to the first embodiment, the length from the splitting part 605 to each output part is equal to one-quarter the effective wavelength. Furthermore, in the splitting unit 107 according to the fourth embodiment, as with that according to the second embodiment, the characteristic impedance of each transmission line following the splitting part 805 is approximately equal to √2 times the characteristic impedance of the transmission line before being split, and the impedance at the output part of each split transmission line is equal to the input impedance. Furthermore, as in the third embodiment, the resistor 806 is connected between the first output unit 803 and the second output unit 804. The resistor 806 is for increasing the degree of separation between two outputs. The resistor 806 may have a resistance approximately twice the output impedance. However, the impedance of the resistor 806 may be arbitrarily selected. In the present embodiment, the impedance of the resistor 806 is set to 100Ω.

Figure 8B:
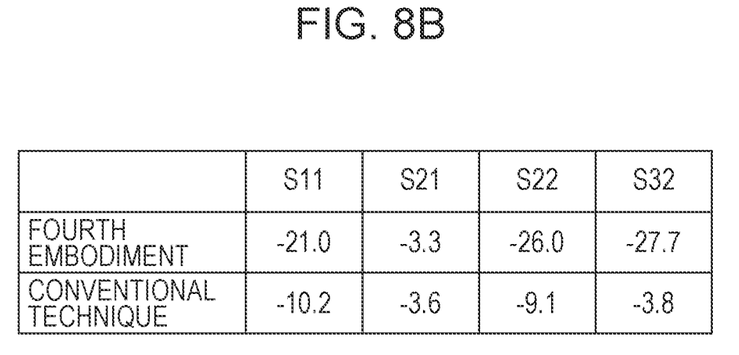
FIG. 8B is a diagram showing scattering parameters thereof.

FIG. 8B shows, in a similar manner as in FIG. 2B, scattering parameters at a frequency of 1 GHz for the splitting unit 107 configured as shown in FIG. 8A according to the fourth embodiment and for the splitting unit configured according to the conventional technique.

The impedance at each of the port #1, the port #2, and the port #3 is set to 50Ω. In the case of the splitting unit 107 according to the present embodiment, it is possible to achieve a small reflection S11 at the input part, a small loss S21 to the output part, and a good separation S32 between the output parts.

Figure 9A:
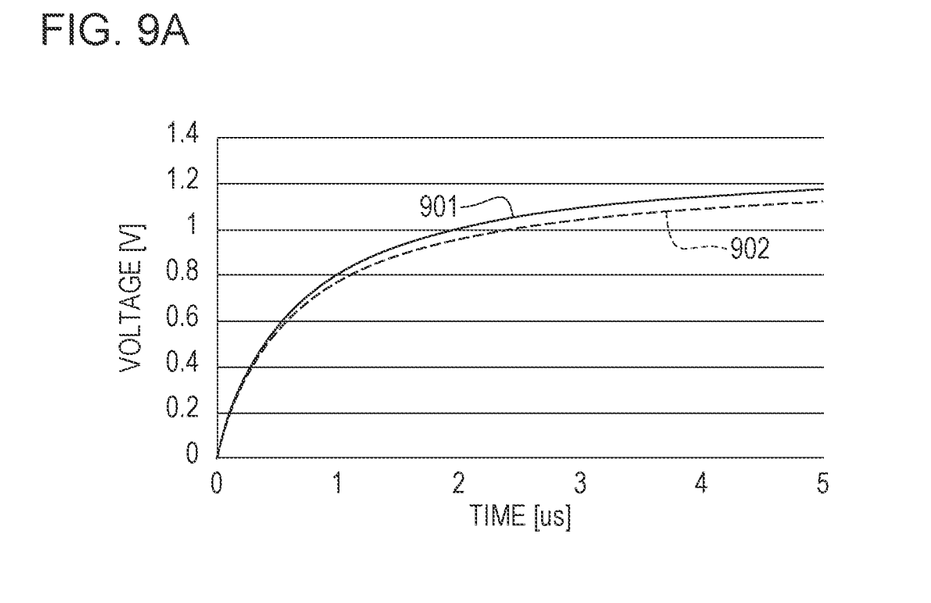
FIGS. 9A and 9B are each a graph showing a simulated waveform of a voltage at an output part according to the fourth embodiment.
Figure 9B:
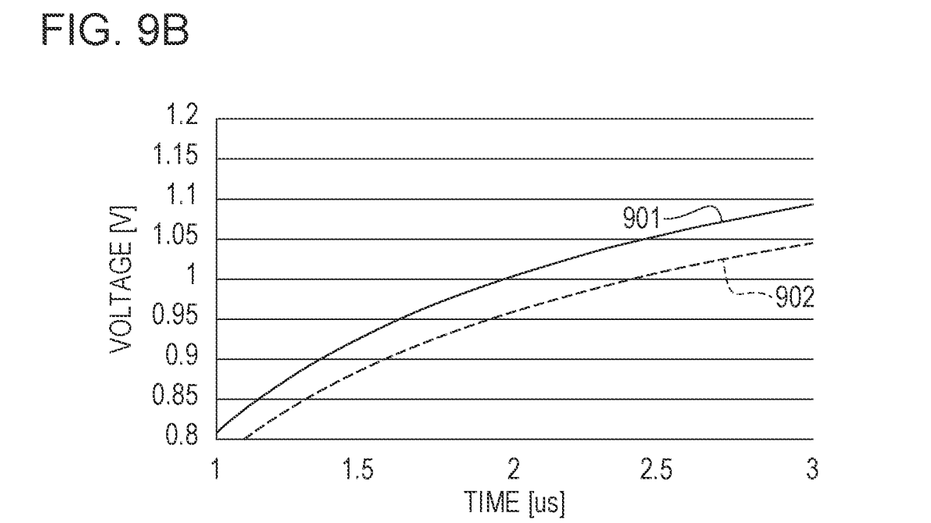

The circuit configuration of the power receiver 102 using the splitting unit 107 according to the fourth embodiment is the same as that described above with reference to the circuit diagram shown in FIG. 3A according to the first embodiment. FIG. 9A shows a result of a simulation of a voltage-time waveform at the output part 307 for the same parameter values as those in FIG. 3B according to the first embodiment. FIG. 9B is an enlarged representation of a part of the graph in FIG. 9A in a range of the output voltage from 0.8 to 1.2 V and a range of time from 1 to 3 us. In each of FIGS. 9A and 9B, a solid line 901 represents a voltage waveform at the output part 307 for a case where the splitting unit 107 according to the fourth embodiment shown in FIG. 8A is used as the splitting part 302, a broken line 902 represents a voltage waveform at the output part 307 for a case where the splitting unit according to the conventional technique is used as the splitting part 302. From these figures, it can be seen that a time needed for the output voltage to reach 1 V is 1.95 us for the configuration according to the present embodiment, and 2.38 us for the configuration according to the conventional technique. That is, the present embodiment can charge the voltage to 1 V 18.1% faster than the conventional technique can.

In the present embodiment, diodes are used to rectify the AC power, but other electronic components such as transistors may be used. The power transmission/reception antennas may be directional antennas. The antenna may include a plurality of elements and may perform beam tilting together with the power transmission unit and the control unit. In a case where sufficiently high power can be received, the first and second charging units may not be provided, and the first and second rectification units may be directly connected to the control unit and may be used to drive the system.

In the present embodiment, the number of splits is two, but the number of splits is not limited to two, and the splitting unit may have three or more splits. Also in this case, the splitting unit may be configured in a similar manner as described above according to the present embodiment while preventing a reduction in the conversion efficiency to a DC signal.

Fifth Embodiment

Figure 10:
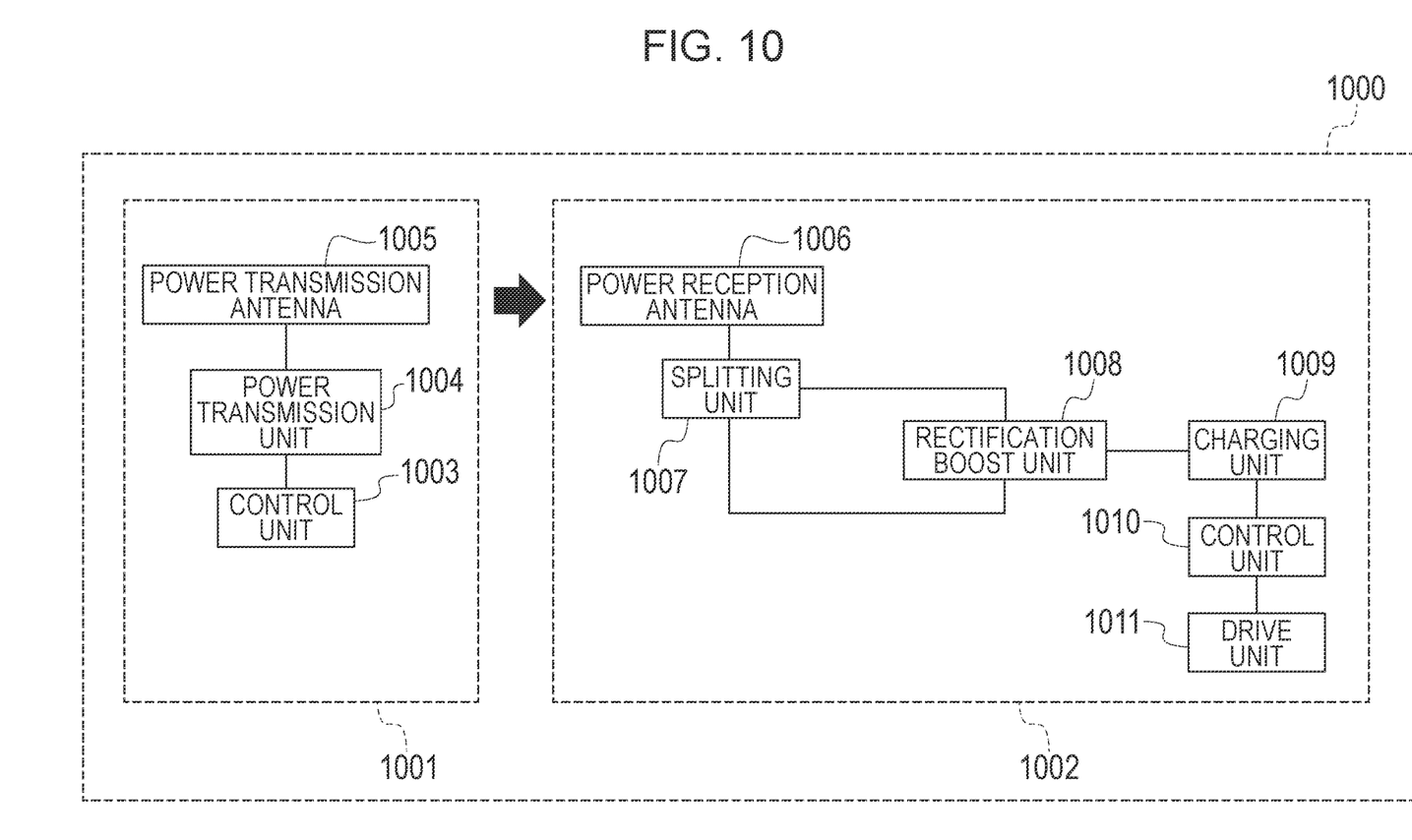
FIG. 10 is a diagram showing a system configuration of a wireless power transmission system according to a fifth embodiment.

FIG. 10 is a diagram showing a system configuration of a wireless power transmission system 1000 (hereinafter also referred to simply as the system 1000) according to a fifth embodiment. The system 1000 includes a power transmitter 1001 that transmits AC power and a power receiver 1002 that receives the AC power. The power receiver 1002 rectifies the received AC power to DC power and uses it as system drive power.

The power transmitter 1001 includes a control unit 1003, a power transmission unit 1004, and a power transmission antenna 1005. A control unit 1003, a power transmission unit 1004, and a power transmission antenna 1005 are respectively similar to the control unit 103, the power transmission unit 104, and the power transmission antenna 105 shown in FIG. 1.

The power receiver 1002 includes a power reception antenna 1006, a splitting unit 1007, a rectification boost unit 1008, a charging unit 1009, a control unit 1010, and a drive unit 1011. The power reception antenna 1006 receives an electromagnetic wave transmitted from the power transmission antenna 1005. The received electromagnetic wave is split by the splitting unit 1007, and signals obtained as a result of being split are rectified to direct current and boosted by the rectification boost unit 1008. The DC power obtained as a result of the rectification and boost by the rectification boost unit 1008 is used to charge the charging unit 1009. The control unit 1010 causes the drive unit 1011 to perform driving using the power charged in the charging unit 1009.

Figure 11A:
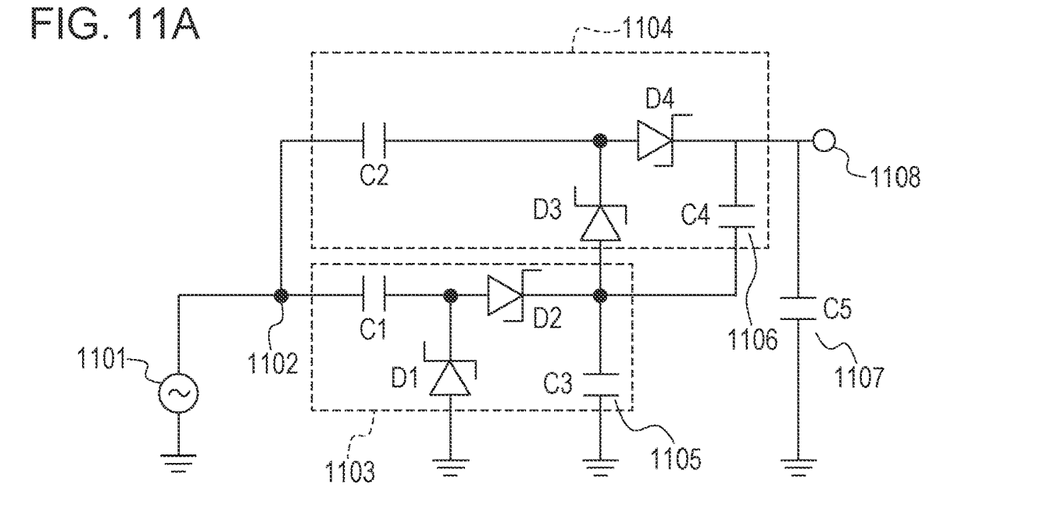
FIG. 11A is a circuit diagram of a power receiver according to the fifth embodiment.

FIG. 11A illustrates a circuit diagram of the power receiver 1002 according to the fifth embodiment. The AC voltage source 1101 is a voltage source simulating the received power received by the power receiver 1002. A splitting part 1102 corresponds to the splitting unit 1007 shown in FIG. 10. A first rectification boost circuit 1103 and a second rectification boost circuit 1104 correspond to the rectification boost unit 1008 shown in FIG. 10. In the present embodiment, the rectification boost unit 1008 is formed in a two-stage Cockcroft-Walton circuit configuration, but other types of rectification boost circuits may be used.

As in the first embodiment, Schottky barrier diodes are used as diodes D1 to D4. The capacitance of capacitors C1, C2, C3 and C4 are set to 1000 pF. A capacitor C5 functioning as the charging unit 1009 in FIG. 10 is set to 1000 pF. The output part 1108 is connected to the control unit 1010 and the drive unit 1011.

Figure 11B:
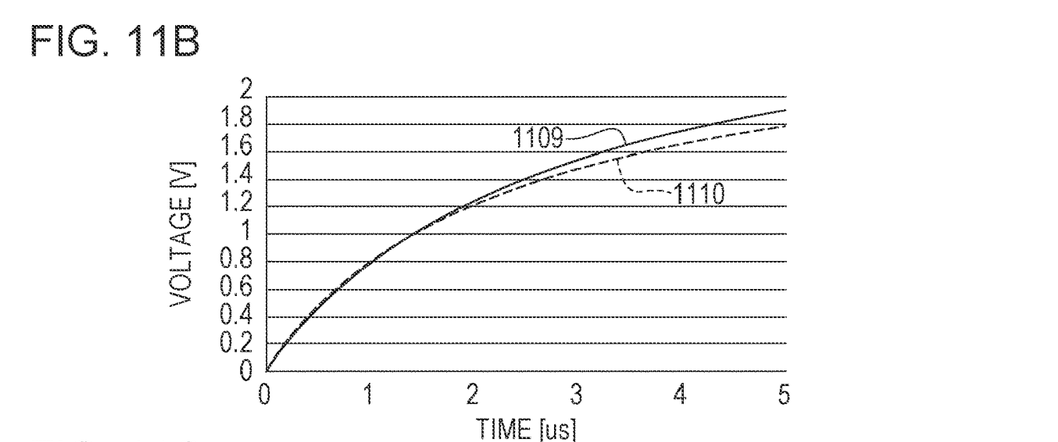
FIGS. 11B and 11C are each a graph showing a simulated waveform of a voltage at an output part.
Figure 11C:
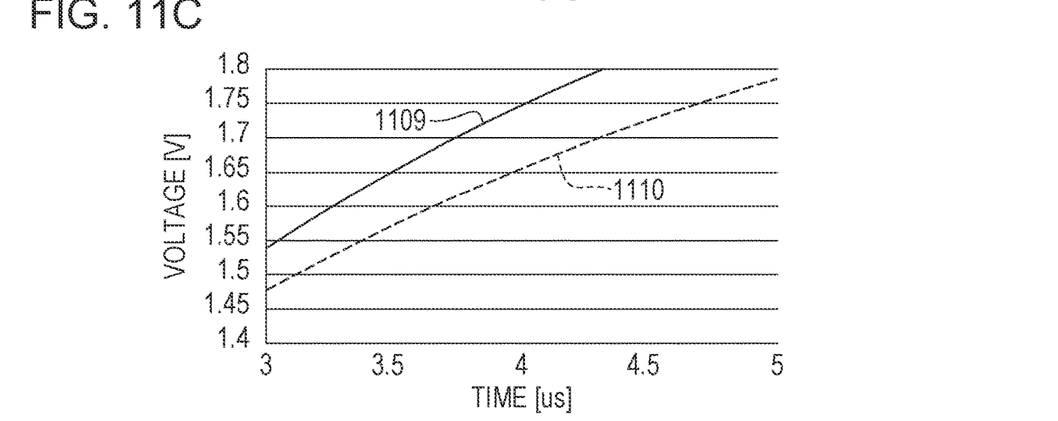

FIG. 11B shows a result of a simulation of a voltage-time waveform at the output part 1108 according to the present embodiment. FIG. 11C is an enlarged representation of a part of the graph in FIG. 11B in a range of the output voltage from 1.4 to 2 V and a range of time from 3 to 5 us. In each of FIGS. 11B and 11C, a solid line 1109 represents a voltage waveform at the output part 1108 for a case where the splitting unit 107 according to the third embodiment shown in FIG. 6A is used as the splitting part 1102, a broken line 1110 represents a voltage waveform at the output part 1108 for a case where the splitting unit according to the conventional technique is used as the splitting part 1102. From these figures, it can be seen that a time needed for the output voltage to reach 1.75 V is 4.02 us for the case where the splitting unit 107 according to the third embodiment is used, and 4.69 us for the case where the splitting unit according to the conventional technique is used. That is, the configuration using the splitting unit according to the third embodiment can charge the voltage to 1.75 V 14.3% faster than the conventional technique can.

In the present embodiment, diodes are used to rectify the AC power, but other electronic components such as transistors may be used. The power transmission/reception antennas may be directional antennas. The antenna may include a plurality of elements and may perform beam tilting together with the power transmission unit and the control unit. In a case where sufficiently high power can be received, the charging unit may not be provided, and the rectification boost unit may be directly connected to the control unit and may be used to drive the system.

In the present embodiment, the number of splits is two, but the number of splits is not limited to two, and the splitting unit may have three or more splits. Also in this case, the splitting unit may be configured in a similar manner as described above according to the present embodiment while preventing a reduction in the conversion efficiency to a DC signal.

The splitting unit 1007 used in the present embodiment is not limited to the splitting unit 107 according to the third embodiment, but the splitting unit 107 according to one of the first, second, and fourth embodiments may be used.

In any of the embodiments, power is transmitted from the transmission antenna to the reception antenna, but in addition to this, a radio signal for performing data communication may be transmitted.

According to various embodiments the present disclosure, it is possible to suppress a reduction in a conversion efficiency in a wireless power transmission system in which received power is split.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments the present disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-179746, filed Oct. 27, 2020 which is hereby incorporated by reference herein in its entirely.

What is claimed is:

1. A wireless power transmission system comprising:
a power reception unit configured to receive AC power;

a first transmission line, one end of which is connected to the power reception unit;

a splitting unit configured such that one end of the splitting unit is connected to an other end of the first transmission line and the splitting unit is split into at least one end of a second transmission line and one end of a third transmission line;

a first rectification unit connected to an other end of the second transmission line; and a second rectification unit connected to an other end of the third transmission line;

wherein a transmission line length between the one end and the other end of the second transmission line and a transmission line length between the one end and the other end of the third transmission line are each substantially equal to one fourth of an effective wavelength of the AC power, and wherein the effective wavelength is derived based on a dielectric constant of a substrate on which the splitting unit is formed.

2. The wireless power transmission system according to claim 1, wherein a characteristic impedance of the second transmission line and a characteristic impedance of the third transmission line are each approximately $\sqrt{2}$ times a characteristic impedance of the first transmission line.

3. The wireless power transmission system according to claim 1, further comprising a resistor connected between the other end of the second transmission line and the other end of the third transmission line.

4. The wireless power transmission system according to claim 1, wherein the first rectification unit and the second rectification unit are each formed in a Cockcroft-Walton circuit configuration.

5. The wireless power transmission system according to claim 1, further comprising a charging unit for charging electric power, wherein the power obtained as a result of the rectification performed by the first rectification unit and the second rectification unit is used to charge the charging unit.

6. The wireless power transmission system according to claim 5, further comprising a drive unit and a control unit, wherein the control unit controls the drive unit by using the power charged in the charging unit.

7. The wireless power transmission system according to claim 5, wherein the charging unit includes a capacitor.

8. The wireless power transmission system according to claim 1, wherein the first rectification unit and the second rectification unit rectify the AC power into DC power.

9. The wireless power transmission system according to claim 1, wherein the first rectification unit and the second rectification unit each include a diode.

10. The wireless power transmission system according to claim 1, wherein the AC power is power carried by a microwave electromagnetic wave.

11. A control method of controlling a wireless power transmission system, the wireless power transmission system comprising a power reception unit configured to receive AC power, a first transmission line whose one end is connected to the power reception unit, a splitting unit configured such that one end of the splitting unit is connected to an other end of the first transmission line and the splitting unit is split into at least one end of a second transmission line and one end of a third transmission line, a first rectification unit connected to an other end of the second transmission line; and a second rectification unit connected to an other end of the third transmission line; wherein a transmission line length between the one end and the other end of the second transmission line and a transmission line length between the one end and the other end of the third transmission line are each substantially equal to one fourth of an effective wavelength of the AC power, the control method comprising:

receiving the AC power by the power reception unit; and rectifying the received AC power into DC power by the first rectification unit and the second rectification unit, and wherein the effective wavelength is derived based on a dielectric constant of a substrate on which the splitting unit is formed.

12. A non-transitory computer-readable storage medium storing instructions that, when executed by a computer, cause the computer to perform a control method on a wireless power transmission system, the wireless power transmission system comprising a power reception unit configured to receive AC power, a first transmission line whose one end is connected to the power reception unit, a splitting unit configured such that one end of the splitting unit is connected to an other end of the first transmission line and the splitting unit is split into at least one end of a second transmission line and one end of a third transmission line, a first rectification unit connected to an other end of the second transmission line; and a second rectification unit connected to an other end of the third transmission line; wherein a transmission line length between the one end and the other end of the second transmission line and a transmission line length between the one end and the other end of the third transmission line are each substantially equal to one fourth of an effective wavelength of the AC power, the control method comprising:

receiving the AC power by the power reception unit; and rectifying the received AC power into DC power by the first rectification unit and the second rectification unit, wherein the effective wavelength is derived based on a dielectric constant of a substrate on which the splitting unit is formed.

13. The wireless power transmission system according to claim 1, wherein the effective wavelength is determined by the frequency of the AC power, the dielectric constant of the substrate on which the splitting unit is formed, and the type of the second transmission line and the third transmission line.

* * * * *